(12) United States Patent
Matsuura et al.

(10) Patent No.: US 10,838,063 B2
(45) Date of Patent: Nov. 17, 2020

(54) DISTANCE MEASUREMENT APPARATUS AND ANGLE ADJUSTMENT METHOD OF THE SAME

(71) Applicant: Hitachi-LG Data Storage, Inc., Tokyo (JP)

(72) Inventors: Naoya Matsuura, Tokyo (JP); Toshimasa Kamisada, Tokyo (JP); Katsuhiko Izumi, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 331 days.

(21) Appl. No.: 15/963,238

(22) Filed: Apr. 26, 2018

(65) Prior Publication Data

US 2019/0011560 A1  Jan. 10, 2019

(30) Foreign Application Priority Data

Jul. 10, 2017  (JP) ................................ 2017-134476

(51) Int. Cl.
| | |
|---|---|
| *G01S 17/42* | (2006.01) |
| *G01S 7/4865* | (2020.01) |
| *G01S 17/89* | (2020.01) |
| *G01S 7/486* | (2020.01) |
| *G01S 7/484* | (2006.01) |
| *G01S 7/497* | (2006.01) |

(52) U.S. Cl.
CPC ............. *G01S 17/42* (2013.01); *G01S 7/484* (2013.01); *G01S 7/4865* (2013.01); *G01S 7/4868* (2013.01); *G01S 7/4972* (2013.01); *G01S 17/89* (2013.01)

(58) Field of Classification Search
CPC .. H04N 9/3182; H04N 9/3194; H04N 9/3126; G03B 21/208; G03B 21/2053
See application file for complete search history.

(56) References Cited

U.S. PATENT DOCUMENTS

2009/0210193 A1   8/2009  Nagase
2017/0357000 A1*  12/2017 Bartlett ................. G01S 7/4817

FOREIGN PATENT DOCUMENTS

| JP | 2004-159253 A | 6/2004 |
|---|---|---|
| JP | 2009-174830 A | 8/2009 |

* cited by examiner

*Primary Examiner* — Luke D Ratcliffe
(74) *Attorney, Agent, or Firm* — Mattingly & Malur, PC (57) ABSTRACT

A distance measurement apparatus 1 includes a light emitting unit 11 that irradiates a subject with a light-source light from a light source, a light receiving unit 12 that receives a reflected light from the subject, a distance calculation unit 13 that calculates a distance to the subject based on a time difference from the irradiation of the light-source light to the reception of the reflected light; and an image processing unit 20 that generates a distance image of the subject based on the calculated distance. Further, the apparatus includes a first rotation mechanism 14 that adjusts an irradiation angle of the light emitting unit and a second rotation mechanism 15 that adjusts a light receiving angle of the light receiving unit, in which the angles of the light emitting unit and the light receiving unit may be adjusted independently of each other.

3 Claims, 5 Drawing Sheets

DISTANCE MEASUREMENT APPARATUS AND ANGLE ADJUSTMENT METHOD OF THE SAME

CLAIM OF PRIORITY

The present application claims priority from Japanese patent application serial No. JP 2017-134476, filed on Jul. 10, 2017, the content of which is hereby incorporated by reference into this application.

BACKGROUND OF THE INVENTION

(1) Field of the Invention

The present invention relates to a distance measurement apparatus for measuring a distance to a subject and outputting the measured distance as a distance image.

(2) Description of the Related Art

An apparatus is disclosed which measures a distance to a subject based on a transmission time of light (hereinafter, a TOF method: time-of-flight) and outputs an image indicating a position of the subject from distance data (hereinafter, a distance measurement apparatus). The apparatus includes, as its configuration, a light emitting unit that emits a light-source light from a light source in order to measure the distance to the subject, and a light receiving unit that detects a reflection light from the subject, both of which are referred to as a TOF sensor.

For example, a person location detection apparatus disclosed in JP 2009-174830 A includes a distance change detecting section for detecting a distance change to an object in a room space based on distance information from a TOF method distance image sensor and a person distinguishing section for distinguishing a person by identifying a shape of a detected distance change area to detect a direction and distance to the distance change area that is identified as a shape of a person as a location of a person.

Further, JP 2004-159253 A discloses a monitoring camera having a configuration in which a light source for illuminating an object to be photographed by the camera is provided and the camera and the light source may be rorated integrally.

SUMMARY OF THE INVENTION

For example, in the case of monitoring a movement of a person in a shop by a distance measurement apparatus, the apparatus is often installed on a ceiling in the shop and is used by irradiating a monitoring area on a floor surface with a light-source light from a TOF sensor (a light emitting unit) in an oblique direction. At that time, an intensity distribution of a reflected light reflected from the monitoring area and detected by a light receiving unit is asymmetric, and there is a phenomenon that the intensity differs between a near side and a far side of the monitoring area. In other words, when an intensity of the reflected light in a region far from the TOF sensor is smaller than an intensity of the reflected light in a region near the TOF sensor, and the monitoring area is wide such that the intensity of the light-source light cannot be secured sufficiently, there is a problem that an accuracy of the distance measurement deteriorates in the region far from the TOF sensor.

In the above-mentioned JP 2009-174830 A or JP 2004-159253 A, no particular consideration has been given to an intensity of reflected light from the subject. Further, in JP 2004-159253 A, the camera and the light source are integrated as a mechanism for adjusting an angle, and it is not taken into consideration that an intensity distribution of the reflected light becomes asymmetric.

An object of the present invention is to provide a distance measurement apparatus for increasing an intensity of reflected light in a region far from a TOF sensor in a monitoring area when distance measurement is performed by irradiating the monitoring area with a light-source light in an oblique direction.

According to the present invention, there is provided a distance measurement apparatus for measuring a distance to a subject and outputting the same as a distance image, including: a light emitting unit that irradiates the subject with a light-source light from a light source; a light receiving unit that receives a reflected light reflected from the subject; a distance calculation unit that calculates a distance to the subject based on a time difference from the irradiation of the light-source light to the reception of the reflected light; and an image processing unit that generates a distance image of the subject based on the calculated distance. Further, the apparatus includes a first rotation mechanism that adjusts an irradiation angle of the light emitting unit and a second rotation mechanism that adjusts a light receiving angle of the light receiving unit, in which the angles of the light emitting unit and the light receiving unit may be adjusted independently of each other.

According to the present invention, a deviation in the intensity of the reflected light within the monitoring area is eliminated, and a distance measurement accuracy can be secured over the entire monitoring area.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Figure 1:
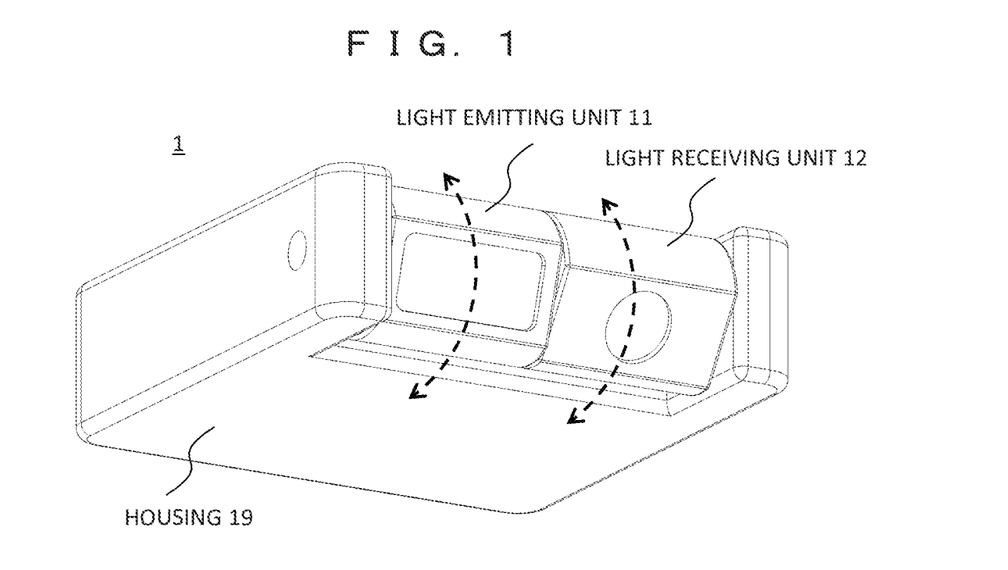
FIG. 1 is an external view illustrating an embodiment of a distance measurement apparatus according to the present invention.

FIG. 1 is an external view illustrating an embodiment of a distance measurement apparatus according to the present invention. A distance measurement apparatus 1 measures a distance to a subject by the TOF method and displays the distance of an object included in the measured subject in, for example, a color to output the distance as an object image. In order to measure the distance to the subject by the TOF method, a light emitting unit 11 for irradiation of a light-source light and a light receiving unit 12 for receiving a reflected light are provided on a side face of a housing 19. As will be described later, an irradiation direction of the light emitting unit 11 and a light receiving direction of the light receiving unit 12 can be independently adjusted in a vertical direction (a direction of the arrow).

Figure 2:
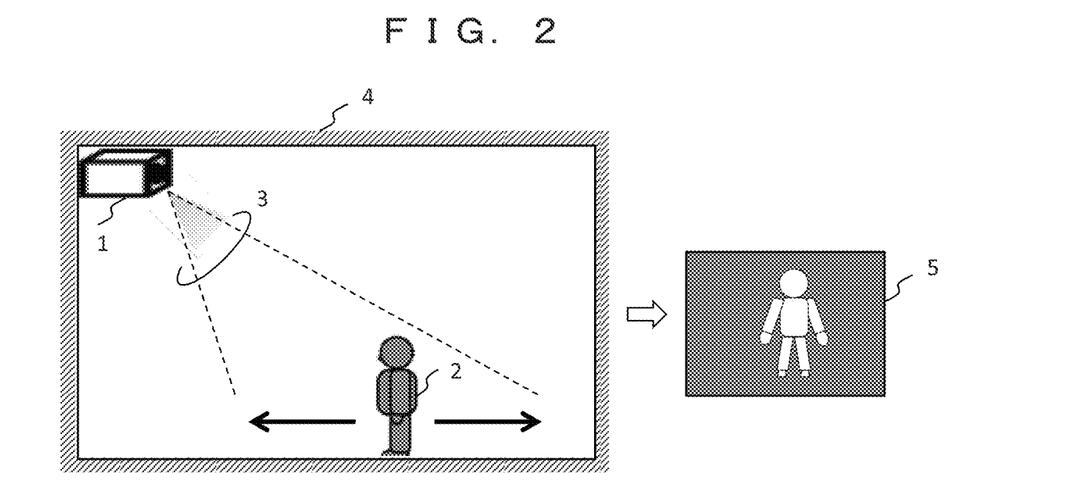
FIG. 2 is a diagram illustrating an example of using the distance measurement apparatus.

FIG. 2 is a diagram illustrating an example of using the distance measurement apparatus. Here, a person 2 existing in a room 4 is set as a subject (a monitoring target). In this case, in order to cover a moving range of the person 2, that is, set a wide measurement range (a monitoring range), the distance measurement apparatus 1 is installed on a ceiling of the room 4 and performs a measurement in a direction of looking down a floor obliquely. The measurement direction at this time is a range indicated by reference numeral 3, and the light emitting unit 11 and the light receiving unit 12 are required to cover the range.

As a result of the distance measurement, an object image of the person 2 as illustrated in an image 5 is obtained. If a horizontal direction is set to be the measurement direction, the object image is an image seen from a front of the person 2. However, it becomes difficult to measure an area on a back side (shade) of the person 2. In addition, when a vertical direction is set to be the measurement direction, the measurement range becomes narrow, and the object image is an image seen from above a head of the person 2. Thus, it is inappropriate as a person image. Therefore, it is efficient to perform the measurement in a direction 3 of looking down obliquely.

Figure 3:
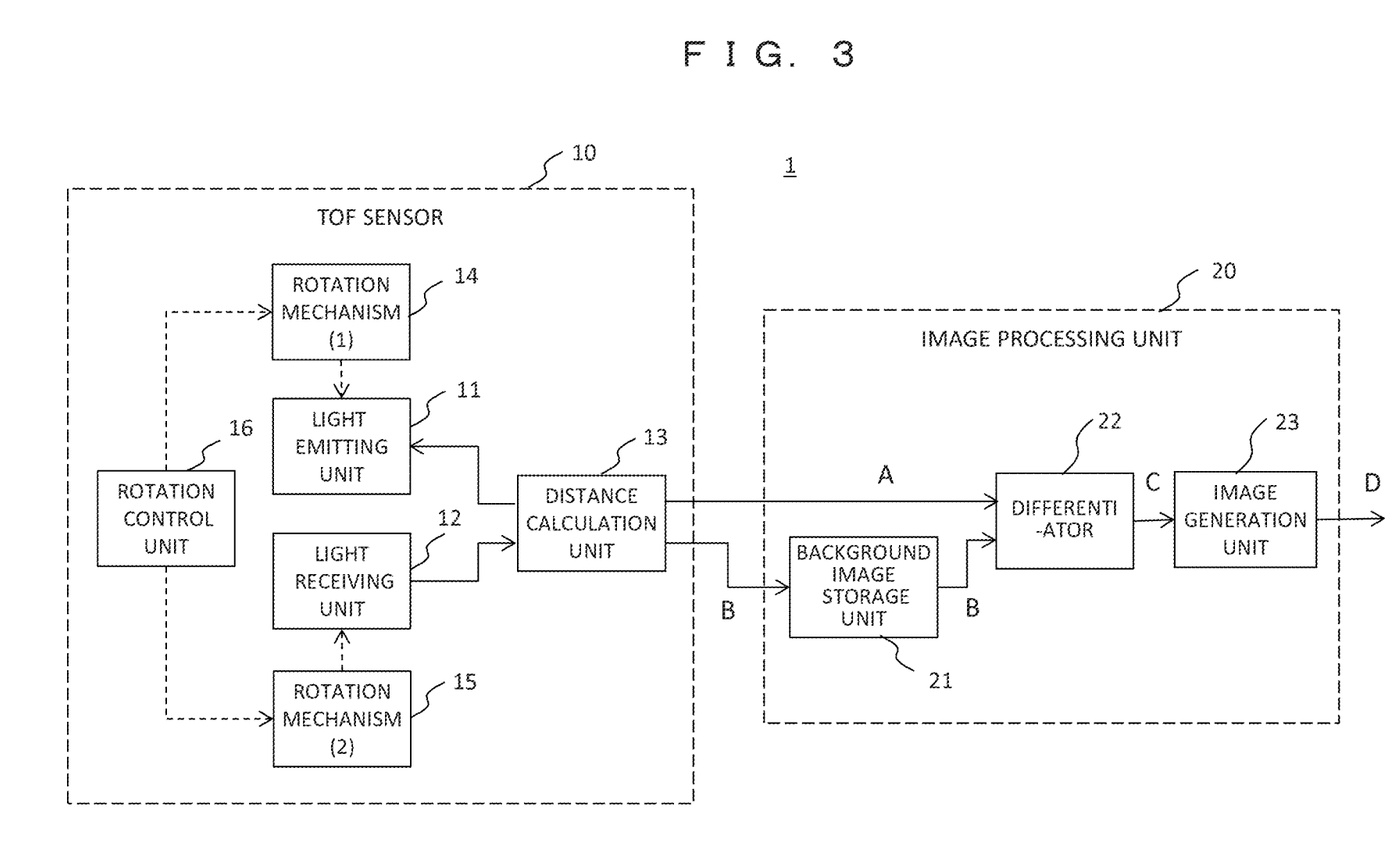
FIG. 3 is a block diagram illustrating an internal configuration of the distance measurement apparatus.

FIG. 3 is a block diagram illustrating an internal configuration of the distance measurement apparatus. The distance measurement apparatus 1 includes a distance measurement unit (hereinafter, a TOF sensor) 10 that acquires a distance data to the subject by the TOF method and an image processing unit 20 that generates an object image by extracting a portion of an object such as a person based on the distance data. Further, an operation of each unit is controlled by a CPU (not illustrated).

A TOF sensor 10 includes a light emitting unit 11 including a light source such as a laser diode (LD) or a light emitting diode (LED) that irradiates the subject with a pulsed light, a light receiving unit 12 such as a CCD sensor or a CMOS sensor that receives the pulsed light reflected from the subject, and a distance calculation unit 13 that drives the light emitting unit 11 and calculates the distance to the subject based on a detection signal of the light receiving unit 12. The light receiving unit 12 photographs a two-dimensional image of the subject, and the distance calculation unit 13 outputs a distance data of the two-dimensional image of the subject. A principle of the distance measurement by the TOF will be described later.

Further, the TOF sensor 10 includes a first rotation mechanism 14 that adjusts an irradiation direction (an emitting angle) of the light emitting unit 11 and a second rotation mechanism 15 that adjusts a light receiving direction (a light receiving angle) of the light receiving unit 12. The first and second rotation mechanisms 14 and 15, for example, including an actuator such as a step motor. A rotation control unit 16 supplies a drive signal to the first and second rotation mechanisms 14 and 15 to adjust the emitting angle of the light emitting unit 11 and the light receiving angle of the light receiving unit 12 in a desired direction.

As operation modes of the rotation control unit 16, the following is possible.
(1) interlocking with a remote controller to adjust the angle to be a desired angle by user's remote control.
(2) storing combinations (angle differences) of optimal angles of the light emitting unit 11 and the light receiving unit 12 in a look-up table (LUT) and being automatically set based on the stored combinations.
(3) automatically adjusting the angles of the light emitting unit 11 or the light receiving unit 12 to be optimal values such that a reflection intensity is equal to or more than a required value, using a reflected light intensity sensor.

Further, the operations of (1) to (3) may be appropriately combined.

The image processing unit 20 includes a background image storage unit 21, a differentiator 22, and an image generation unit 23, and generates and outputs an object image such as a person from a distance data acquired by the TOF sensor 10. Initially, the background image storage unit 21 obtains distance data without a person from the distance calculation unit 13, and saves the same as a background image data B. Subsequently, when a distance data (an input image data A) including a person is output from the distance calculation unit 13, the differentiator 22 performs a differentiation with the background image data B stored in the background image storage unit 21 and outputs differential image data C. The differentiation is a processing that allows a signal of the input image data A, as it is, passes in a region where a distance difference between the input image data A and the background image data B is larger than a threshold value, and takes the signal of the input image data A as being not a signal in a region where the distance difference is equal to or less than the threshold.

The image generation unit 23 performs a colorization processing for changing a hue of the object image based on the distance data of the object image, and outputs the result to an external device or displays the result on a display device or the like. In this case, image processing also may be a processing of changing brightness, contrast, and the like. By viewing a colorized object image D, the user may easily recognize a position (distance) and a shape (posture) of an object such as a person.

Figure 4A:
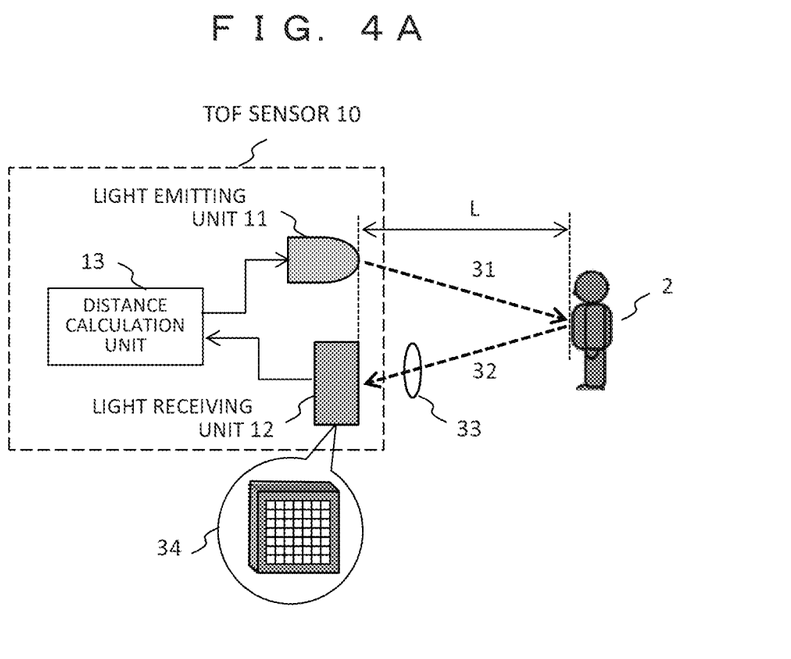
FIG. 4A is a diagram for describing a principle of a distance measurement by a TOF method.
Figure 4B:
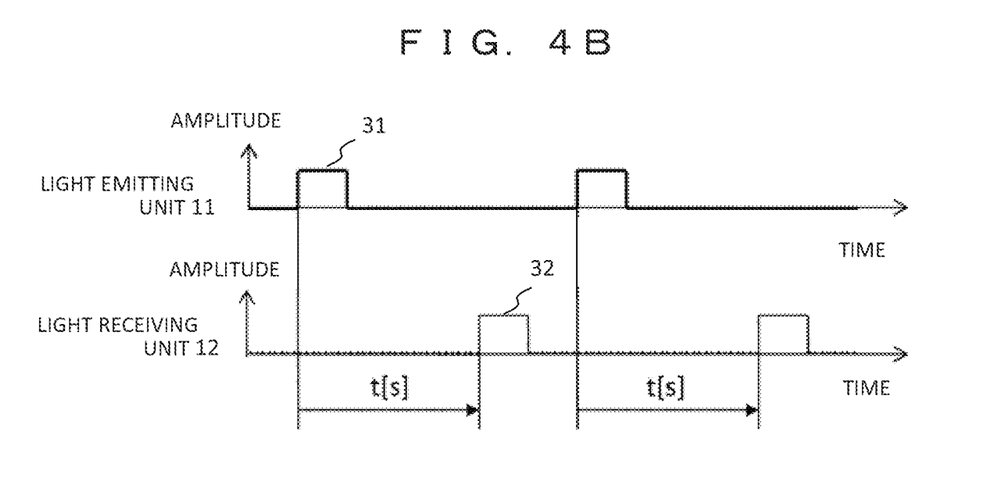
FIG. 4B is a diagram for describing the principle of the distance measurement by the TOF method.

FIGS. 4A and 4B are diagrams for describing a principle of the distance measurement by the TOF method. In the TOF (time-of-flight) method, a distance is calculated based on a time difference between a light emitting signal and a light receiving signal.

FIG. 4A is a diagram illustrating a relationship between the TOF sensor 10 and a subject 2 (for example, a person). The TOF sensor 10 includes a light emitting unit 11 and a light receiving unit 12 and irradiates the subject 2 with a light-source light 31 for distance measurement from the light emitting unit 11. An infrared light may be used for the light-source light and assumed to have a predetermined diffusion angle covering a measurement range (a monitoring range). The light receiving unit 12 receives a reflected light 32 obtained from the light-source light 31 being reflected by the subject 2, receiving the reflected light 32 by a two-dimensional sensor 34 such as a CCD via an objective lens 33. The subject 2 is present at a position separated by L [m] from the light emitting unit 11 and the light receiving unit 12. Assuming that a light speed is c [m/s] and a time difference from when the light emitting unit 11 starts the irradiation using the light-source light to when the light receiving unit 12 receives the reflected light is t [s], the distance L [m] to the subject 2 is obtained by:

$$L[m]=c[m/s] \times t[s]/2 \quad (1).$$

FIG. 4B is a diagram illustrating measurement of the time difference t. The distance calculation unit 13 measures the time difference t based on a timing of the light-source light 31 irradiated from the light emitting unit 11 and a timing of the reflected light 32 received by the light receiving unit 12 and calculates the distance L from the subject 2 based on the equation (1). Further, based on a deviation amount of a light receiving timing at each pixel position in the two-dimensional sensor 34, a difference in distance to each position of the subject, that is, an irregular shape of the subject 2 may be obtained.

Next, an angle setting of the light emitting unit 11 and the light receiving unit 12 will be described. As described in FIG. 2, the distance measurement apparatus 1 (TOF sensor 10) is installed on the ceiling of the room, and the irradiation direction of the light emitting unit 11 and the light receiving direction of the light receiving unit 12 are set to be an oblique direction with respect to a floor surface as a monitoring area. Further, in the following description, the direction of the light emitting unit 11 or the light receiving unit 12 is represented by an angle θ obtained by looking in a horizontal direction with respect to a directly downward direction (a vertical direction) when viewed from the TOF sensor 10. Therefore, the angle θ=0° refers to the vertical direction, and θ=90° refers to the horizontal direction. It is assumed that the angle of the light emitting unit 11 is θ1 and the angle of the light receiving unit 12 is θ2.

Figure 5A:
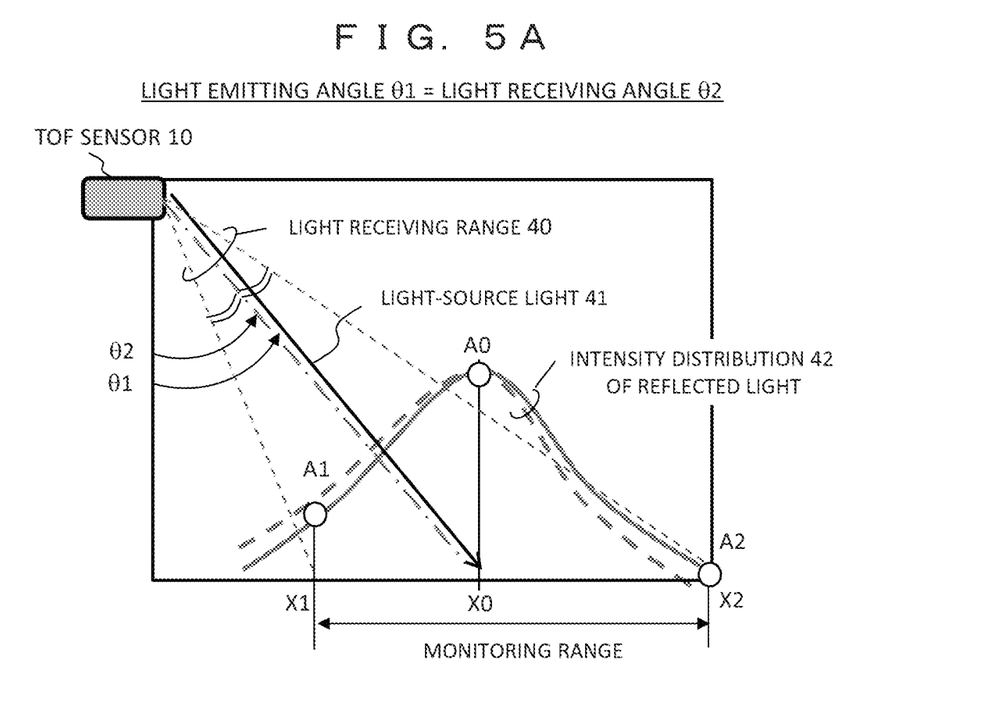
FIG. 5A is a diagram illustrating an intensity distribution of a reflected light when a light emitting angle and a light receiving angle are the same.

FIG. 5A is a diagram illustrating an intensity distribution of the reflected light when the angles of the light emitting unit 11 and the light receiving unit 12 are set to be equal (θ1=θ2). The horizontal axis is the horizontal position with a position just below the TOF sensor as a base point, and the intensity distribution of the reflected light is indicated by the curve 42 when the light-source light 41 (its central direction is indicated by an arrow) is irradiated. In this case, there may be a problem that a reflection intensity on a far side of the monitoring range is lowered, deteriorating a measurement accuracy. The reason will be explained below.

First, when a desired monitoring range is assumed to be a range of the horizontal positions X1 to X2, a light receiving range 40 (dotted lines) of the light receiving unit 12 is set so as to cover the range. At that time, a light receiving sensitivity of the light receiving unit 12 is maximum in the direction of a light receiving angle θ2, and the sensitivity is attenuated on both sides thereof. Therefore, the light receiving angle θ2 (alternate long and short dash line) is set in a central direction of the angle at which the monitoring range is to be expected so that the same light receiving sensitivity is obtained at both end positions X1 and X2 of the monitoring range. At this time, a horizontal position X0 where the light receiving angle θ2 intersects is not the center of the monitoring ranges X1 to X2, but it is close to a left side of the drawing (a near side of the monitoring range when viewed from the TOF sensor 10).

Subsequently, the angle θ1 of the light emitting unit 11 is set to be equal to the angle θ2 of the light receiving unit 12 (θ1=θ2). Therefore, the light-source light 41 from the light emitting unit 11 is irradiated toward the horizontal position X0, whereby the intensity distribution of the reflected light becomes as illustrated by the curve 42. The shape of the curve 42 illustrates a Gaussian distribution depending on a directivity characteristic of the light source used in the light emitting unit 11 and has a maximum intensity A0 at the center position X0 and attenuated intensities on both sides. Here, even when an emission intensity of the light-source light 41 is symmetrical with respect to an optical axis direction, the intensity attenuates in accordance with an irradiation distance from the light source to the floor surface, so that the intensity distribution of the reflected light becomes asymmetric as indicated by broken lines on both sides of the center position X0. In other words, it rises on the left side close to the light source and has a recessed shape on the right side far from the light source.

At this time, when comparing reflection intensities A1 and A2 at both the end positions X1 and X2 of the monitoring range, the intensity A2 at the position X2 becomes smaller than the intensity A1 at the position X1, as is apparent from the drawing. That is, the reflection intensity on the far side of the monitoring range when viewed from the TOF sensor 10 becomes smaller than the reflection intensity on the near side of the monitoring range. This is because the direction of the light emitting angle θ1 (intersecting position X0) of the light emitting unit 11 is not located in the center of the monitoring ranges X1 to X2 but on the near side of the monitoring range. In addition, this is because the intensity distribution of the reflected light becomes an asymmetric shape like the curve (broken line) 42, and the intensity increases on the near side of the monitoring range while the intensity decreases on the far side of the monitoring range.

If the distance measurement is performed under such a setting, the detection signal on the far side of the monitoring range will be lowered, possibly resulting in deterioration of measurement accuracy. Therefore, in this embodiment, the angles of the light emitting unit 11 and the light receiving unit 12 are set differently.

Figure 5B:
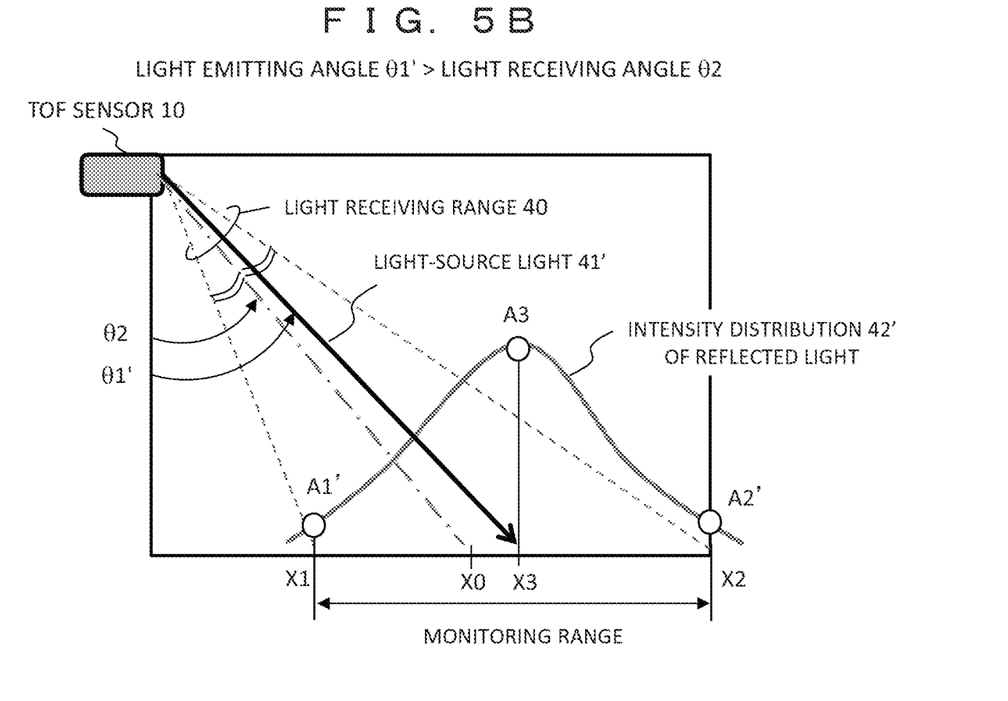
FIG. 5B is a diagram illustrating the intensity distribution of the reflected light when the light emitting angle is larger than the light receiving angle.

FIG. 5B is a diagram illustrating the intensity distribution of the reflected light when the angle of the light emitting unit 11 is set to be larger than the angle of the light receiving unit 12 according to the present embodiment. That is, the intensity distribution of the reflected light when the angle of the light-source light 41' is θ1' is illustrated by a curve 42'. Thereby, the reflection intensity on the far side of the monitoring range may be increased, improving the measurement accuracy. The reason will be explained below.

The settings of the light receiving range 40 for the monitoring range X1 to X2 and the angle θ2 of the light receiving unit 12 are the same as those in FIG. 5A. On the other hand, the angle θ1' of the light emitting unit 11 is set larger than the angle θ2 of the light receiving unit 12 (θ1'>θ2). Therefore, an intersecting position X3 of the light-source light 41' from the light emitting unit 11 is farther than the intersecting position X0 of the light receiving angle θ2 (moves to the right side in the drawing). According to this, the intensity distribution of the reflected light has the maximum intensity A3 at a center position X3 as illustrated by the curve 42'. At this time, when comparing the reflection intensities A1' and A2' at both the end positions X1 and X2 of the monitoring range, the intensity A2' at the position X2 on the far side of the monitoring range may increases to approach the intensity A1' at the position X1 on the near side of the monitoring range.

This makes it possible to reduce the deviation of the intensity of the reflected light within the monitoring range and secure the distance measurement accuracy over the entire monitoring range.

Next, an optimal combination of the angle of the light emitting unit 11 and the angle of the light receiving unit 12 will be described. Here, for the sake of simplicity, it is assumed that the intensity distribution shape of the reflected light is symmetrical.

Figure 6A:
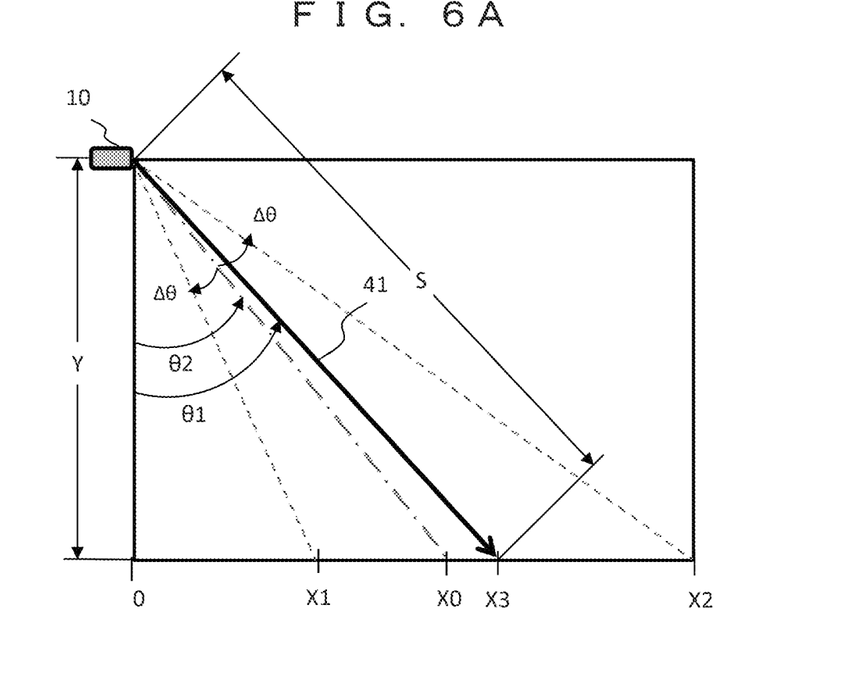
FIG. 6A is a diagram for describing a calculation method of an optimal combination of the light emitting angle and the light receiving angle.

FIG. 6A is a diagram for describing a calculation method of an optimal combination of the angle of the light emitting unit 11 and the angle of the light receiving unit 12. It is assumed that the light emitting angle of the light emitting unit 11 is θ1, the light receiving angle of the light receiving unit 12 is θ2, and an angle of viewing (one-side diffusion angle) with respect to the monitoring range is Δθ. Further, it is assumed that the monitoring range on the floor surface is X1 to X2, the intersecting position of the light emitting angle θ1 is X3, and the intersecting position of the light receiving angle θ2 is X0. By setting the intersecting position X3 of the light emitting angle θ1 to be the center position of the monitoring range X1 to X2, it is possible to equalize the reflection intensities at both ends X1 and X2 of the monitoring range. That is, an angle θ1 is calculated so that a distance (X3−X1) and a distance (X2−X3) may be the same. As a result of geometric calculation, it may be sufficient to satisfy the following equation:

$$\tan \theta 1 = \{\tan(\theta 2 + \Delta\theta) + \tan(\theta 2 - \Delta\theta)\}/2 \qquad (2).$$

Figure 6B:
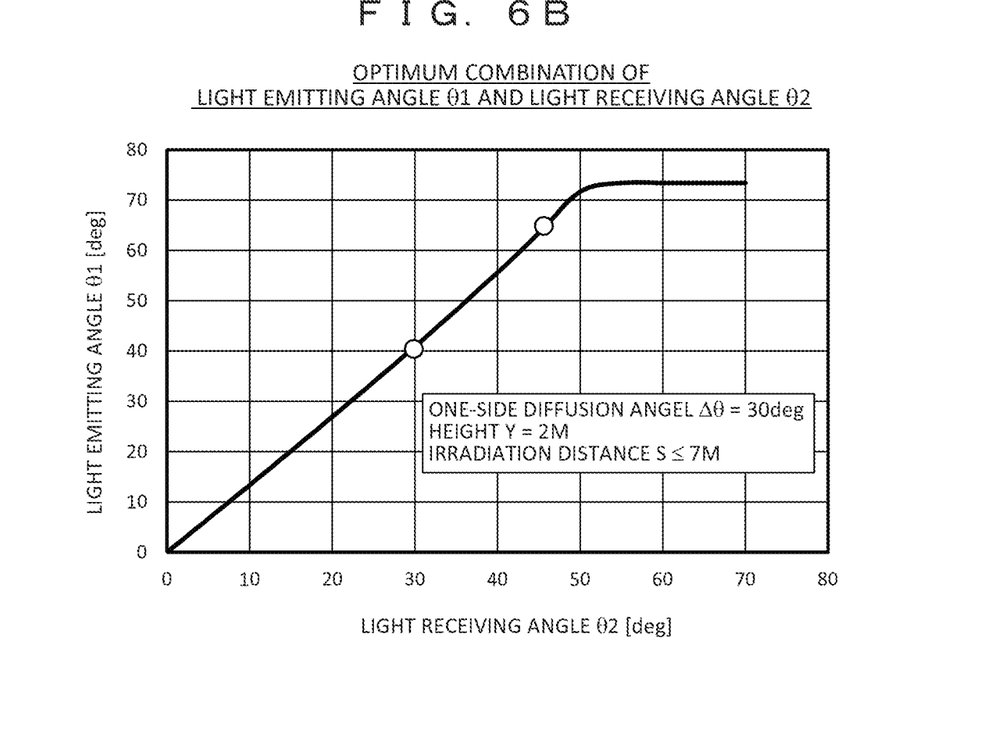
FIG. 6B is a diagram illustrating an example of an optimal combination of the light emitting angle and the light receiving angle.

FIG. 6B is a diagram illustrating an example of an optimal combination of the angle of the light emitting unit 11 and the angle of the light receiving unit 12. The horizontal axis represents the light receiving angle θ2, and the vertical axis represents the light emitting angle θ1. Here, a relationship between the light emitting angle θ1 and the light receiving angle θ2 is obtained from the aforementioned equation (2) with the one-sided diffusion angle Δθ=30° of the light receiving unit. For example, an optimal combination is that the light emitting angle θ1=40.9° when the light receiving angle θ2=30°, and the light emitting angle θ1=63.4° when the light receiving angle θ2=45° (indicated by a white circle). An angular difference (θ1−θ2) between the light emitting angle and the light receiving angle increases with the light receiving angle θ2. Although not illustrated, the angular difference (θ1−θ2) also depends on the angle of viewing (one-side diffusion angle) Δθ and increases with Δθ.

Here, when the light emitting angle θ1 and the light receiving angle θ2 become large to approach the horizontal direction, the irradiation distance from the light emitting unit 11 to the floor surface is increased, and an intensity peak of the reflected light itself is reduced. Therefore, the light emitting angle θ1 has an upper limit value. In FIG. 6A, it is assumed that a height from the floor surface to the TOF sensor 10 is Y, and an irradiation distance from the light emitting unit to the floor surface is S. For example, when the height Y=2 m and a maximum value (a limit value) of the irradiation distance S is 7 m, the light emitting angle θ1=73.4 is the upper limit value, and the angle below the upper limit value must be used.

The relationship of the optimal angle in FIG. 6B is obtained by obtaining the angle of viewing Δθ of the monitoring range as a parameter and storing the same in a look-up table (LUT). A rotation control unit 16 can be optimally adjust the angle of the light emitting unit 11 and the angle of the light receiving unit 12 with reference to the table.

In the analysis of FIGS. 6A and 6B described above, it is assumed that the shape of the intensity distribution of the reflected light is symmetric. However, an optimal combination of the angle of the light emitting unit 11 and the angle of the light receiving unit 12 can be calculated even when the intensity distribution shape becomes asymmetric by adding the attenuation factor according to the irradiation distance from the light source.

According to the above configuration, the deviation in the intensity of the reflected light within the monitoring range is eliminated, and the distance measurement accuracy can be ensured over the entire monitoring area.

In the embodiments described above, a case where a person is taken as an example of the measurement target is described, but it goes without saying that it can be similarly applied to a case where an object other than a person is to be measured.

What is claimed is:

1. A distance measurement apparatus for measuring a distance to a subject and outputting the same as a distance image, comprising:
   a light emitting unit that irradiates the subject with a light-source light from a light source;
   a light receiving unit that receives a reflected light reflected from the subject;
   a distance calculation unit that calculates a distance to the subject based on a time difference from the irradiation of the light-source light to the reception of the reflected light; and
   an image processing unit that generates a distance image of the subject based on the calculated distance,
   wherein the apparatus includes a first rotation mechanism that adjusts an irradiation angle of the light emitting unit and a second rotation mechanism that adjusts a light receiving angle of the light receiving unit, and
   wherein the angle of the light emitting unit and the angle of the light receiving unit are adjusted independently of each other,
   the distance measurement apparatus further comprising:
   a rotation control unit that drives the first rotation mechanism and the second rotation mechanism; and
   a table that stores an optimal combination of the irradiation angle of the light emitting unit and the light receiving angle of the light receiving unit,
   wherein the rotation control unit adjusts the irradiation angle of the light emitting unit and the light receiving angle of the light receiving unit by the first rotation mechanism and the second rotation mechanism with reference to the table, and
   wherein, when the distance measurement apparatus is installed on a ceiling to measure the subject present on a floor surface in an oblique direction, using a measurement range for the subject on the floor surface as a parameter, the optimal combination of the angles stored in the table is obtained by combining the irradiation angle of the light emitting unit, the irradiation angle being an angle set in a direction to a center position of the measurement range, and the light receiving angle of the light receiving unit, the light receiving angle being an angle set in a central direction of an angle at which the measurement range is expected.

2. A distance measurement apparatus for measuring a distance to a subject and outputting the same as a distance image, comprising:
   a light emitting unit that irradiates the subject with a light-source light from a light source;
   a light receiving unit that receives a reflected light reflected from the subject;
   a distance calculation unit that calculates a distance to the subject based on a time difference from the irradiation of the light-source light to the reception of the reflected light; and
   an image processing unit that generates a distance image of the subject based on the calculated distance,
   wherein the apparatus includes a first rotation mechanism that adjusts an irradiation angle of the light emitting unit and a second rotation mechanism that adjusts a light receiving angle of the light receiving unit, wherein the angle of the light emitting unit and the angle of the light receiving unit are adjusted independently of each other, and wherein, in a case where the distance measurement apparatus is installed on a ceiling to measure the subject present on a floor surface in an oblique direction, when the irradiation angle and the light receiving angle are represented by an angle obtained by looking in a horizontal direction with respect to a directly downward direction when viewed from the distance measurement apparatus, the irradiation angle of the light emitting unit is set to be larger than the light receiving angle of the light receiving unit by the first rotation mechanism and the second rotation mechanism.

3. The angle adjustment method of the distance measurement apparatus according to claim 2, wherein, when the measurement range for the subject is determined on the floor surface, the irradiation angle of the light emitting unit is set in a direction to a center position of the measurement range while the light receiving angle of the light receiving unit is set in a central direction of an angle at which the measurement range is expected.

* * * * *